United States Patent
Ponziani

(10) Patent No.: US 9,436,341 B2
(45) Date of Patent: Sep. 6, 2016

(54) HAPTIC FEEDBACK DEVICES

(71) Applicant: Johnson Electric S.A., Murten (CH)

(72) Inventor: Richard L. Ponziani, Centerville, OH (US)

(73) Assignee: Johnson Electric S.A., Murten (CH)

(*) Notice: Subject to any disclaimer, the term of this patent is extended or adjusted under 35 U.S.C. 154(b) by 138 days.

(21) Appl. No.: 14/071,117

(22) Filed: Nov. 4, 2013

(65) Prior Publication Data
US 2014/0176462 A1   Jun. 26, 2014

Related U.S. Application Data

(60) Provisional application No. 61/745,250, filed on Dec. 21, 2012.

(51) Int. Cl.
G09G 5/00 (2006.01)
G06F 3/046 (2006.01)
G06F 3/01 (2006.01)

(52) U.S. Cl.
CPC .............. G06F 3/046 (2013.01); G06F 3/016 (2013.01); *Y10T 29/49002* (2015.01)

(58) Field of Classification Search
CPC .. G06F 3/016; G06F 3/046; Y10T 29/49002
USPC .............................. 345/173; 178/18.07–18.08
See application file for complete search history.

(56) References Cited

U.S. PATENT DOCUMENTS

| | | | |
|---|---|---|---|
| 6,104,382 A | 8/2000 | Martin et al. | |
| 6,203,076 B1 | 3/2001 | Wytcherley et al. | |
| 6,271,828 B1 | 8/2001 | Rosenberg et al. | |
| 6,380,925 B1 | 4/2002 | Martin et al. | |
| 6,429,846 B2 | 8/2002 | Rosenberg et al. | |
| 6,680,729 B1 | 1/2004 | Shahoian et al. | |
| 6,982,630 B2 | 1/2006 | Beckwith et al. | |
| 6,982,696 B1 | 1/2006 | Shahoian | |

(Continued)

FOREIGN PATENT DOCUMENTS

KR  10-2012-0020485 A   6/2012
WO  2012-082072 A1   6/2012

OTHER PUBLICATIONS

JP Application 2013-156687 filed Jul. 29, 2013.

(Continued)

*Primary Examiner* — Kent Chang
*Assistant Examiner* — Nelson Rosario
(74) *Attorney, Agent, or Firm* — Nixon & Vanderhye P.C.

(57) ABSTRACT

A haptic feedback device (20, 20', 20") comprises a stationary frame (40); a carrier (42) configured for at least one degree of motion relative to the stationary frame; a user interface (44) mounted on the carrier and configured to receive a human impulse; a set (46) of pole pieces; and, a suspension system (48). The haptic actuator (46) comprises a first pole piece (80) mounted to the stationary frame (40); a second pole piece (82) mounted to the carrier (42); and, an electromagnetic coil (84) carried by one of the first pole piece and the second pole piece. The first pole piece and the second pole piece are separately mounted to define an air gap (90) therebetween in a first direction when the electromagnetic coil is not energized, the first direction corresponding to the at least one degree of motion. The suspension system (48) is mechanically separated from both the first pole piece (80) and the second pole piece (92).

28 Claims, 11 Drawing Sheets

(56) References Cited

U.S. PATENT DOCUMENTS

| | | |
|---|---|---|
| 7,148,875 B2 | 12/2006 | Rosenberg et al. |
| 7,209,118 B2 | 4/2007 | Shahoian et al. |
| 7,218,310 B2 | 5/2007 | Tierling et al. |
| 7,233,476 B2 | 6/2007 | Goldenberg et al. |
| 7,265,750 B2 | 9/2007 | Rosenberg |
| 7,336,006 B2 | 2/2008 | Watanabe et al. |
| 7,446,752 B2 | 11/2008 | Goldenberg et al. |
| 7,450,110 B2 | 11/2008 | Shahoian et al. |
| 7,548,232 B2 | 6/2009 | Shahoian et al. |
| 7,561,142 B2 | 7/2009 | Shahoian et al. |
| 7,567,243 B2 | 7/2009 | Hayward |
| 7,656,388 B2 | 2/2010 | Schena et al. |
| 7,728,820 B2 | 6/2010 | Rosenberg et al. |
| 7,764,268 B2 | 7/2010 | Gomez et al. |
| 7,768,504 B2 | 8/2010 | Rosenberg et al. |
| 7,777,716 B2 | 8/2010 | Rosenberg et al. |
| 7,825,903 B2 * | 11/2010 | Anastas et al. ............... 345/173 |
| 7,944,435 B2 | 5/2011 | Rosenberg et al. |
| 7,978,183 B2 | 7/2011 | Rosenberg et al. |
| 7,982,720 B2 | 7/2011 | Rosenberg et al. |
| 8,031,181 B2 | 10/2011 | Rosenberg et al. |
| 8,049,734 B2 | 11/2011 | Rosenberg et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,072,317 B2 | 12/2011 | Sproelich et al. |
| 8,169,402 B2 | 5/2012 | Shahoian et al. |
| 8,232,969 B2 * | 7/2012 | Grant et al. ................. 345/173 |
| 8,593,409 B1 * | 11/2013 | Heubel et al. ............... 345/173 |
| 8,963,665 B2 | 2/2015 | Sawaguchi |
| 2002/0030663 A1 | 3/2002 | Tierling et al. |
| 2003/0038776 A1 | 2/2003 | Rosenberg et al. |
| 2006/0187215 A1 | 8/2006 | Rosenberg et al. |
| 2006/0192771 A1 | 8/2006 | Rosenberg et al. |
| 2007/0013677 A1 | 1/2007 | Rosenberg et al. |
| 2007/0040815 A1 | 2/2007 | Rosenberg et al. |
| 2007/0195059 A1 | 8/2007 | Shahoian et al. |
| 2007/0229478 A1 | 10/2007 | Rosenberg et al. |
| 2007/0285216 A1 | 12/2007 | Tierling et al. |
| 2008/0060856 A1 | 3/2008 | Shahoian et al. |
| 2008/0062122 A1 | 3/2008 | Rosenberg et al. |
| 2008/0062145 A1 | 3/2008 | Shahoian et al. |
| 2008/0068348 A1 | 3/2008 | Rosenberg et al. |
| 2008/0068349 A1 | 3/2008 | Rosenberg et al. |
| 2008/0068350 A1 | 3/2008 | Rosenberg et al. |
| 2008/0068351 A1 | 3/2008 | Rosenberg et al. |
| 2008/0111788 A1 | 5/2008 | Rosenberg et al. |
| 2009/0174672 A1 | 7/2009 | Schmidt |
| 2009/0284498 A1 | 11/2009 | Hayward |
| 2009/0295552 A1 | 12/2009 | Shahoian et al. |
| 2010/0149111 A1 | 6/2010 | Olien |
| 2010/0245254 A1 | 9/2010 | Olien et al. |
| 2010/0309142 A1 * | 12/2010 | Cruz-Hernandez et al. . 345/173 |
| 2011/0037546 A1 | 2/2011 | Marie |
| 2011/0109423 A1 | 5/2011 | Ramsay et al. |
| 2011/0227849 A1 | 9/2011 | Olien et al. |
| 2011/0309918 A1 | 12/2011 | Ramsay |
| 2012/0038582 A1 | 2/2012 | Grant |
| 2012/0056806 A1 | 3/2012 | Rosenberg et al. |
| 2012/0056839 A1 | 3/2012 | Rosenberg et al. |
| 2014/0009005 A1 | 1/2014 | Irwin |

OTHER PUBLICATIONS

JP Application 2012-249913 filed Nov. 14, 2012.
International Search Report and Written Opinion mailed Oct. 16, 2013 in PCT Application No. PCT/US2013/049435.
International Preliminary Report on Patentability mailed Jan. 22, 2015 in PCT Application No. PCT/US2013/049435.

* cited by examiner

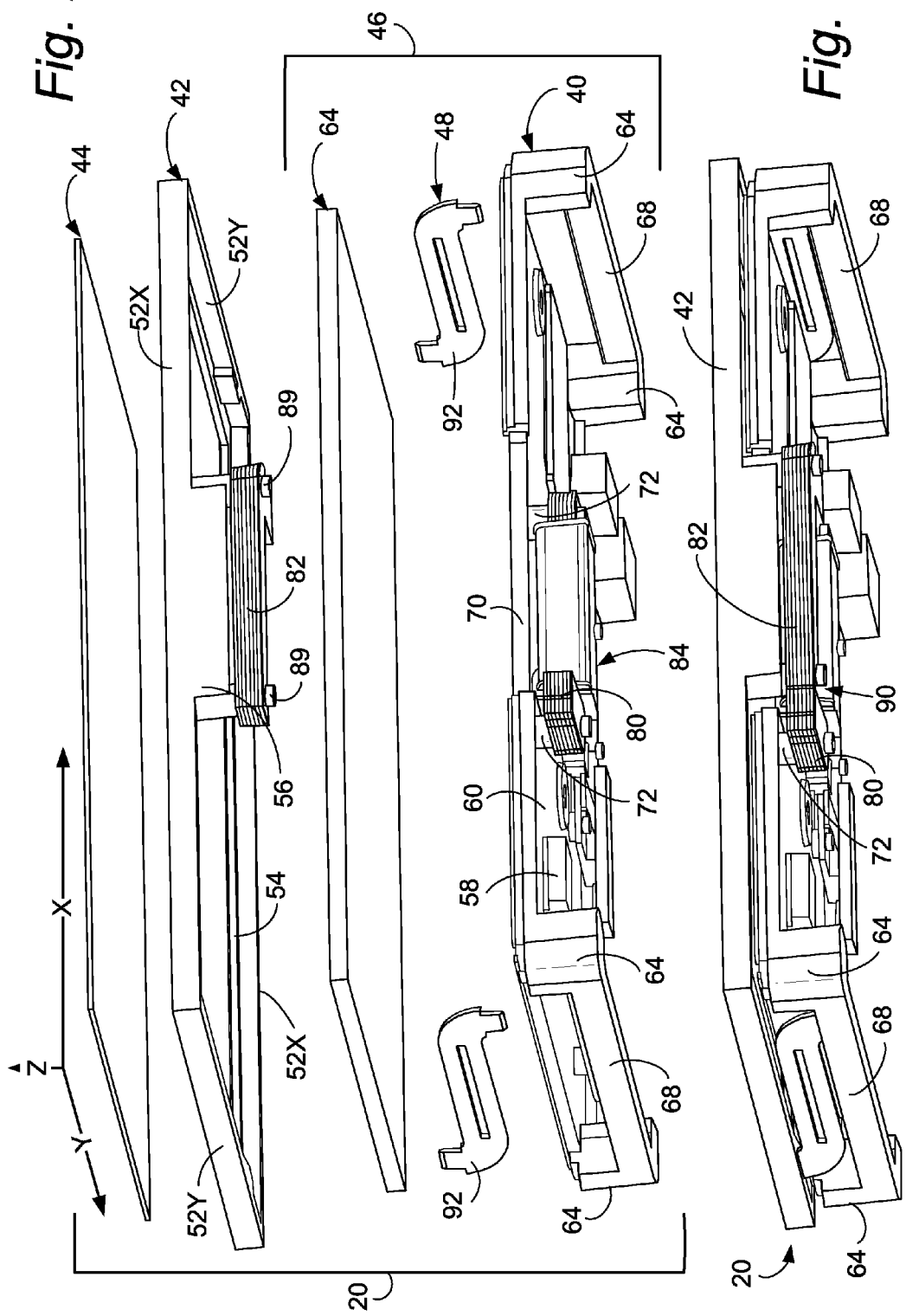

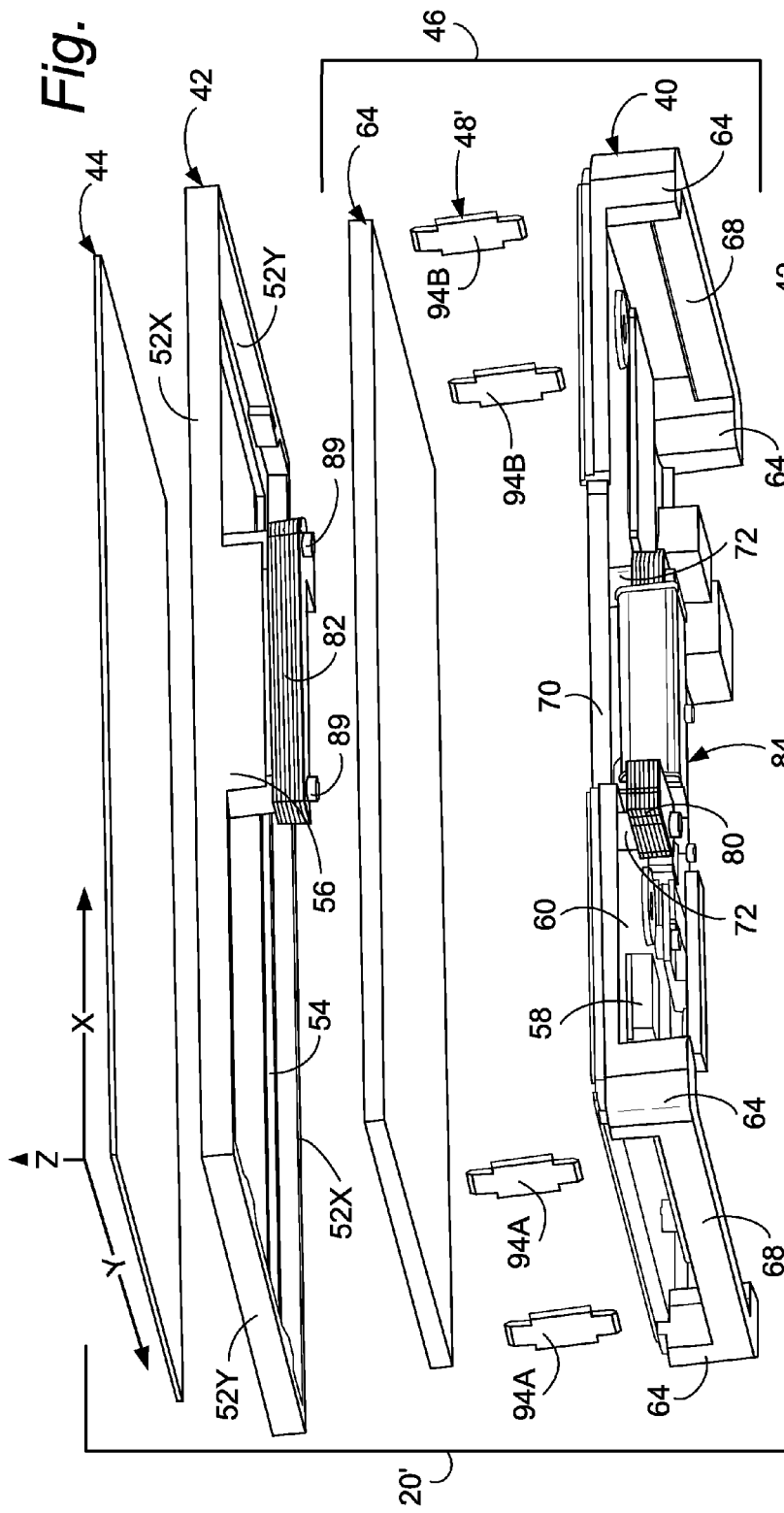

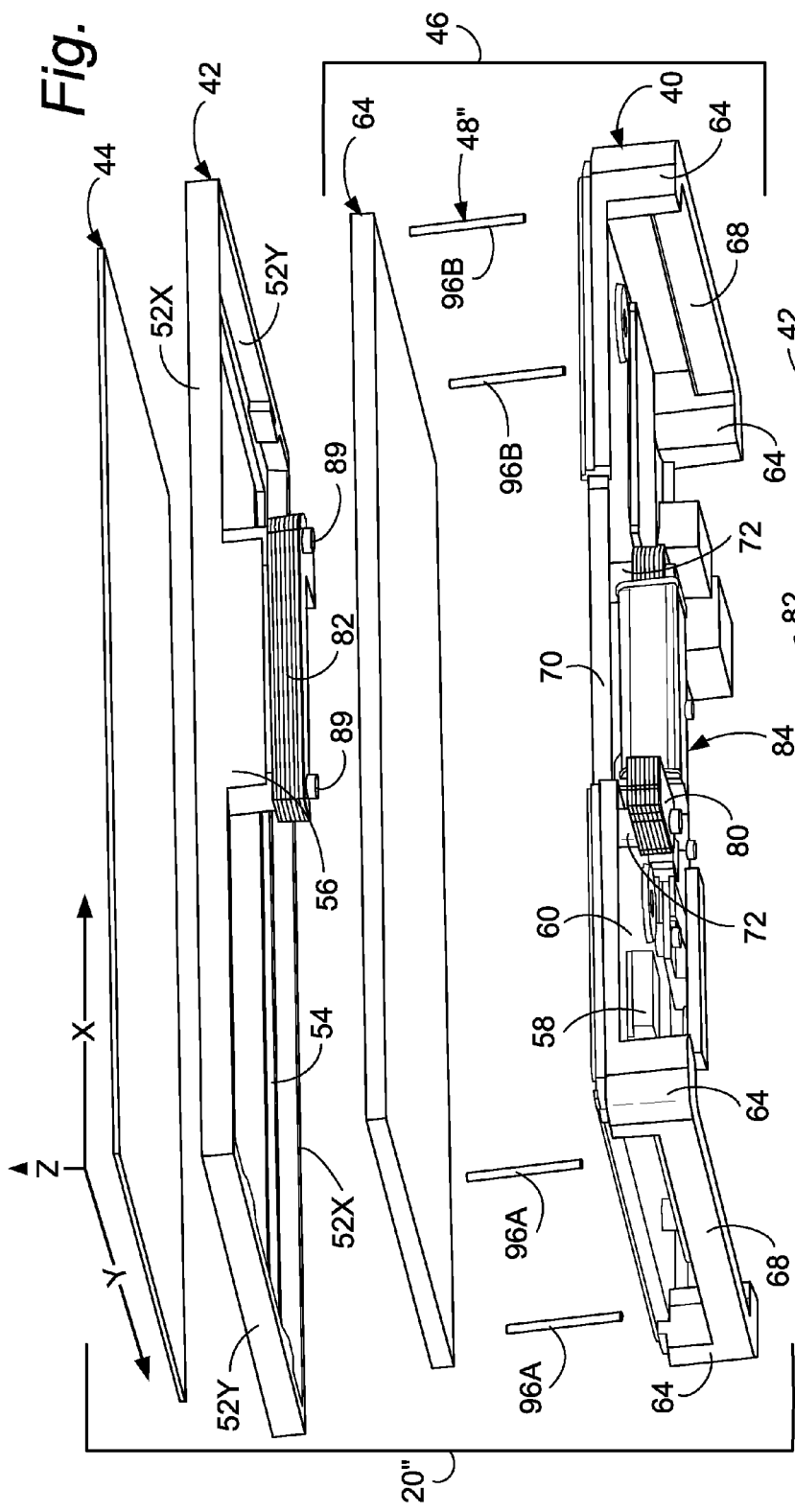

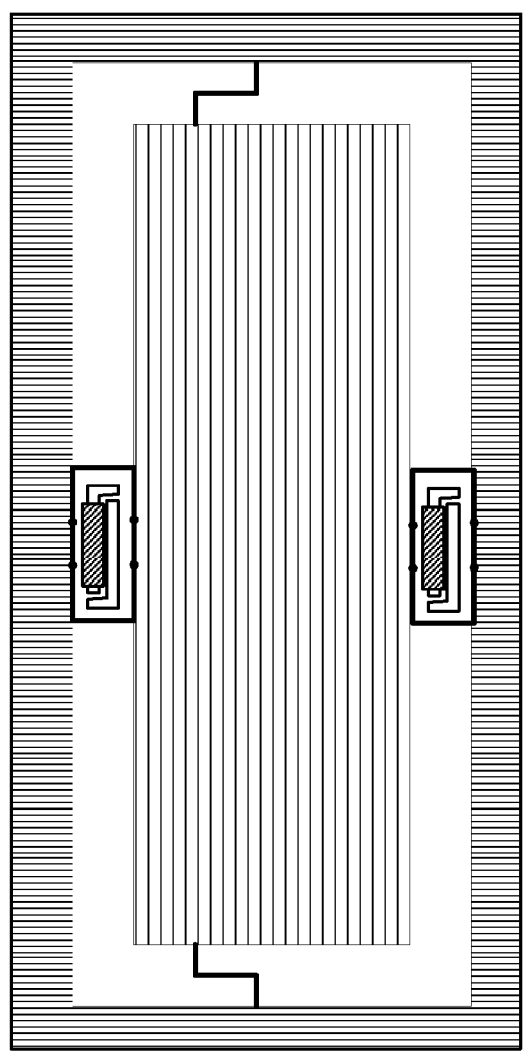
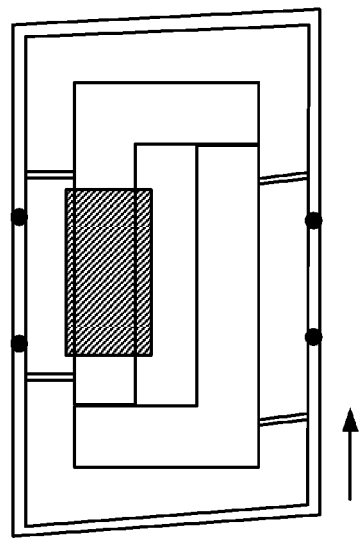
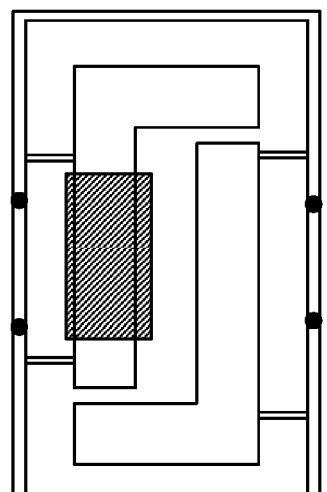
Fig. 13
Fig. 13A
Fig. 13B

HAPTIC FEEDBACK DEVICES

This application claims the priority and benefit of U.S. Provisional Patent Application 61/745,250, filed Dec. 21, 2012, which is incorporated herein by reference in its entirety.

TECHNICAL FIELD

The technology relates to devices which provide tactile feedback upon human activation or operation of an input device, and particularly to devices which provide haptic feedback.

BACKGROUND

Some devices provide a sensory feedback to the human user or operator so that the operator has confidence that the operation sought by the operator has been properly registered. Such is the case, for example, for some computer input devices, such as a mouse or other pointer device which provides a clicking sensation when depressed or operated. By contrast, some input devices, such as a touch screen, for example, do not provide such a click or sensory confirmation. For that reason, it has been proposed to use haptic technology so that, upon human input, a touch screen vibrates in order to provide the confirmatory feedback to the user that the touch screen is receptive to the input. In general, "haptics" is a field of technology which takes advantage of the sense of touch by applying forces, vibrations, or motions to the user.

FIG. 13 shows an example haptic actuator wherein a moveable member (depicted by horizontal hatching when viewed in landscape) is resiliently attached to a stationary member (having vertical hatching) both by two spring members (spaced apart in the horizontal direction) and two pole member-carrying subcomponents (spaced apart in the vertical direction). One of the pole member-carrying subcomponents is shown in FIG. 13A at a time when a coil carried by one of the pole members is not energized, and is shown in FIG. 13B at a time when the coil is energized. A resilient, springy frame or perimeter of each pole member-carrying subcomponent has one opposing side thereof attached by two fasteners (depicted by circles) to the stationary member and another opposing side attached by similar two fasteners to the moveable member. The two pole members of each subcomponent are attached to the subcomponent frame by connecting arms. When the coil is not energized, the frame of each pole member-carrying subcomponent has a rectangular shape, as shown in FIG. 13A. But when the coil is energized, the pole members are attracted toward one another and the springy, resilient frame distorts (e.g., in a direction depicted by the arrow in FIG. 13B) into a non-rectangular, parallelogram shape.

Each pole member-carrying subcomponent may be fabricated to provide a specified gap size between the two pole members. But if fastening of a pole member-carrying subcomponent (to the stationary member or the moveable member) is not accurate, the springy frame of the pole member-carrying subcomponent may be pre-distorted, adversely affecting the non-energized initial gap size.

Thus, the two pole member-carrying subcomponents of the device of FIG. 13 effectively provide a measure of suspension in addition to the two horizontally spaced spring members. The suspension provided by the two pole member-carrying subcomponents may cause interference and adds unpredictability to performance (e.g., to initial gap size, as explained above). The greater the number of parts, the greater is the potential of unintended interference. Measured attributes such as displacement and acceleration levels become highly variable from one manufactured unit to others, thereby compromising quality and user satisfaction.

FIG. 14 illustrates a haptic actuator known as the "A300". The A300 haptic actuator is an intermediate device which is situated between an unillustrated stationary member and an unillustrated moveable member (e.g., which may carry a user input device). The A300 haptic actuator comprises an actuator frame 179 or housing which surrounds both a first pole piece 180 and a second pole piece 182. In the A300 actuator first pole piece 180 (with the electromagnetic coil 184 around it) is rigidly attached to the actuator housing 179, which is then rigidly attached to the unillustrated stationary member. An elongated U-shaped spring 187 connects second pole piece 182 to the actuator housing 179, the second pole piece 182 being carried in an internal channel of spring 187. A gap 191 exists between the first pole piece 180 and the second pole piece 182. In a direction parallel to the gap the spring 187 has an internal channel including a channel mouth oriented toward first pole piece 180 and coil 184. The second pole piece 182 fits into the channel mouth. A backside of spring 187 opposite the channel mouth is connected to an assembly 185 that is in turn connected to the unillustrated moveable member.

Prior art haptic devices, such as those of FIG. 13 and FIG. 14, rely on separate and distinct actuator units, carrying two pole pieces, mounted intermediate a stationary member and a moveable member to provide the haptic effect. These actuator units are limited to approximately 300 microns of actuation travel, so the assembly of the actuator unit to both the stationary member and to the moveable member must be precise. Furthermore, due to inefficiencies, several actuator units are typically needed for each assembly. These actuator units typically include a spring to drive the second pole piece and some type of housing to locate the two pole pieces relative to each other within the actuator unit.

SUMMARY

In one of its aspects the technology disclosed herein concerns a haptic feedback device. The haptic feedback device comprises a stationary frame; a carrier; a user interface; a set of pole pieces; and, a suspension system. The stationary frame comprises a first pole piece mounted thereto. The carrier is configured for at least one degree of motion relative to the stationary frame and comprises a second pole piece mounted thereto. The user interface is mounted on or comprises the carrier and configured to receive an impulse (e.g., a human impulse). An electromagnetic coil is carried by one of the first pole piece and the second pole piece. The electromagnetic coil is selectively energized as a result of receipt of the human impulse. The first pole piece and the second pole piece are separately located relative to the stationary frame and the carrier, respectively, to define an air gap in a first direction when the electromagnetic coil is not energized. The first direction corresponds to the at least one degree of motion. The suspension system is configured to connect the carrier to the stationary frame and to allow relative movement between the carrier and the stationary frame in the first direction when the electromagnetic coil is energized to drive the second pole piece toward the first pole piece at the gap. The suspension system is mechanically separated from both the first pole piece and the second pole piece.

In an example embodiment, the suspension system being mechanically separated from both the first pole piece and the second pole piece comprises the first pole piece being mechanically connected to the stationary frame, the stationary frame in turn being mechanically connected through the suspension system to the carrier, and the carrier in turn being mechanically connected to the second pole piece. In an example, unlimiting embodiment, "mechanically connected" means direct physical contact.

In an example embodiment, the carrier and the stationary frame are connected by the suspension system but not by a distinct actuator component which comprises both the first pole piece and the second pole piece. In an example embodiment, the first pole piece is not mounted to the stationary frame through a common intermediate component that also serves to locate the second pole piece relative to the carrier. In an example embodiment, the carrier and the stationary frame are connected to one another only by the suspension system. In an example embodiment the first pole piece is rigidly mounted to the stationary frame and the second pole piece is rigidly mounted to the carrier.

In one example embodiment and mode the user interface comprises one or more discrete impulse reactant elements, such as push buttons or depressible buttons. In another example embodiment and mode the user interface comprises an essentially transparent two dimensional matrix configured to sense position of reception of the human impulse; with the transparent user interface overlaying a display screen or the like configured to graphically illustrate plural input operations corresponding to plural positions of the two dimensional matrix.

In one example embodiment and mode the display screen is mounted on the stationary frame, and thus does not move with the carrier. In another example embodiment and mode, the display screen is mounted on and moves with the carrier.

In an example embodiment and mode the suspension system comprises at least two suspension members spaced apart along the first direction. In one example implementation, the at least two suspension members comprise suspension springs which, when at rest, extend essentially in a plane perpendicular to the first direction. In another example implementation, the at least two suspension members comprise a first pair of suspension members and a second pair of suspension members, the first pair of suspension members extending essentially in a first plane and being spaced apart from one another in the first plane; the second pair of suspension members extending essentially in a second plane and being spaced apart from one another in the second plane; the first plane and the second plane being spaced apart from one another and perpendicular to the first direction. In an example implementation, each of the suspension members comprises a resilient pin configured for multi-directional movement. The pin may have an essentially circular cross section and be configured for multi-directional movement of the carrier.

In an example embodiment and mode each pole piece comprises an L-shaped stack of lamination members, with the first pole piece and the second pole piece being oriented so that their major dimensions are parallel to the first direction.

In an example embodiment and mode, the haptic feedback device further comprises a circuit board mounted to the stationary frame, the circuit board comprising a processor which generates a coil-energization signal upon reception of the impulse.

In an example embodiment and mode, the haptic feedback device further comprises a second set of pole pieces. The second set of pole pieces comprises a third pole piece mounted to the stationary frame; a fourth pole piece mounted to the carrier; and, a second electromagnetic coil carried by one of the third pole piece and the fourth pole piece, the second electromagnetic coil being selectively energized as a result of receipt of the impulse. The third pole piece and the fourth pole piece are separately mounted to define a second air gap therebetween in a second direction when the electromagnetic coil is not energized, the second direction corresponding to a second degree of motion, the second direction being perpendicular to the first direction.

In another of its aspects the technology disclosed herein concerns a method of making a haptic feedback device, and the haptic device made thereby. Acts of the method comprise (1) mounting on or including a user interface in a carrier; (2) connecting the carrier through a suspension system to a stationary frame so that the carrier has at least one degree of motion relative to the stationary frame; (3) mounting a first pole piece to the stationary frame and separately mounting a second pole piece to the carrier, the suspension system is mechanically separated from both the first pole piece and the second pole piece; and thereafter (4) setting a size of air gap between the first pole piece and the second pole piece.

In an example embodiment and mode, the suspension system being mechanically separated from both the first pole piece and the second pole piece comprises the first pole piece being mechanically connected to the stationary frame, the stationary frame in turn being mechanically connected through the suspension system to the carrier, and the carrier in turn being mechanically connected to the second pole piece. In an example, unlimiting embodiment, "mechanically connected" means direct physical contact.

In an example embodiment and mode the method further comprises mounting the first pole piece to the stationary frame but not through a common intermediate component that also serves to locate the second pole piece relative to the carrier.

In an example embodiment and mode the method further comprises rigidly mounting the first pole piece directly to the stationary frame and rigidly mounting the second pole piece directly to the carrier.

In an example embodiment and mode the method further comprises providing one or more discrete impulse reactant elements on the user interface.

In an example embodiment and mode the method further comprises forming the user interface to comprise an essentially transparent two dimensional matrix configured to sense position of reception of the human impulse; and overlaying the display screen, configured to graphically illustrate plural input operations corresponding to plural positions of the two dimensional matrix, with the essentially transparent user interface.

In an example embodiment and mode the method further comprises mounting the display screen on the stationary frame.

In an example embodiment and mode the method further comprises mounting the display screen on the carrier.

In an example embodiment and mode the method further comprises forming the suspension system to comprise at least two suspension members spaced apart along the first direction.

In an example embodiment and mode the method further comprises forming the at least two suspension members to comprise suspension springs which, when at rest, extend essentially in a plane perpendicular to the first direction.

In an example embodiment and mode the method further comprises forming the at least two suspension members to comprise a first pair of suspension members and a second pair of suspension members, the first pair of suspension members extending essentially in a first plane and being spaced apart from one another in the first plane; the second pair of suspension members extending essentially in a second plane and being spaced apart from one another in the second plane; the first plane and the second plane being spaced apart from one another and perpendicular to the first direction.

In an example embodiment and mode the method further comprises forming each of the suspension members to comprise a resilient pin configured for multi-directional movement.

In an example embodiment and mode the method further comprises forming each pole piece to comprise an L-shaped stack of lamination members; and, orienting the first pole piece and the second pole piece so that their major dimensions are parallel to the first direction.

In an example embodiment and mode the method further comprises mounting a circuit board mounted to the stationary frame, the circuit board comprising a processor which generates a coil-energization signal upon reception of the impulse.

In an example embodiment and mode the method further comprises: mounting a third pole piece to the stationary frame; mounting a fourth pole piece to the carrier; providing a second electromagnetic coil for one of the third pole piece and the fourth pole piece, the second electromagnetic coil being selectively energized as a result of receipt of the impulse; separately mounting the third pole piece and the fourth pole piece to define a second air gap therebetween in a second direction when the electromagnetic coil is not energized, the second direction corresponding to the a second degree of motion, the second direction being perpendicular to the first direction.

In an example embodiment and mode the method further comprises mounting or including the stationary frame to/on a dashboard of a vehicle.

In an example embodiment and mode the method further comprises mounting or including the stationary frame to/on a control panel of a document processing machine.

In an example embodiment and mode the method further comprises mounting or including the stationary frame to/on a control panel of an automated banking machine.

In an example embodiment and mode the method further comprises a haptic feedback device produced any of the foregoing method embodiments.

The haptic feedback device may be utilized in many diverse environments and/or incorporated into various types of equipment, vehicles, or appliances. As one example, stationary frame may comprise or be configured to mount to a dashboard of a vehicle. As another example, the stationary frame may comprise or be configured to mount to a control panel of a document processing machine, such as a photocopy machine, for example. As yet another example, the stationary frame may comprise or be configured to mount to a control panel of an automated banking machine.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2 is an exploded side view of an example haptic feedback device which comprises a first type of suspension system.

FIG. 3 is a side view of the haptic feedback device of FIG. 2 as at least partially assembled.

FIG. 5 is an exploded side view of an example haptic feedback device which comprises a second type of suspension system.

FIG. 6 is a side view of the haptic feedback device of FIG. 5 as at least partially assembled.

FIG. 7 is an exploded side view of an example haptic feedback device which comprises a third type of suspension system.

FIG. 8 is a side view of the haptic feedback device of FIG. 7 as at least partially assembled.

FIG. 13 is a sectioned view of a first prior art device; FIG. 13A is an enlarged view of a pole member-carrying subcomponent of the device of FIG. 13 when a coil is not energized; FIG. 13B is an enlarged view of the pole member-carrying subcomponent of the device of FIG. 13 when a coil is energized.

DETAILED DESCRIPTION

Figure 1A:
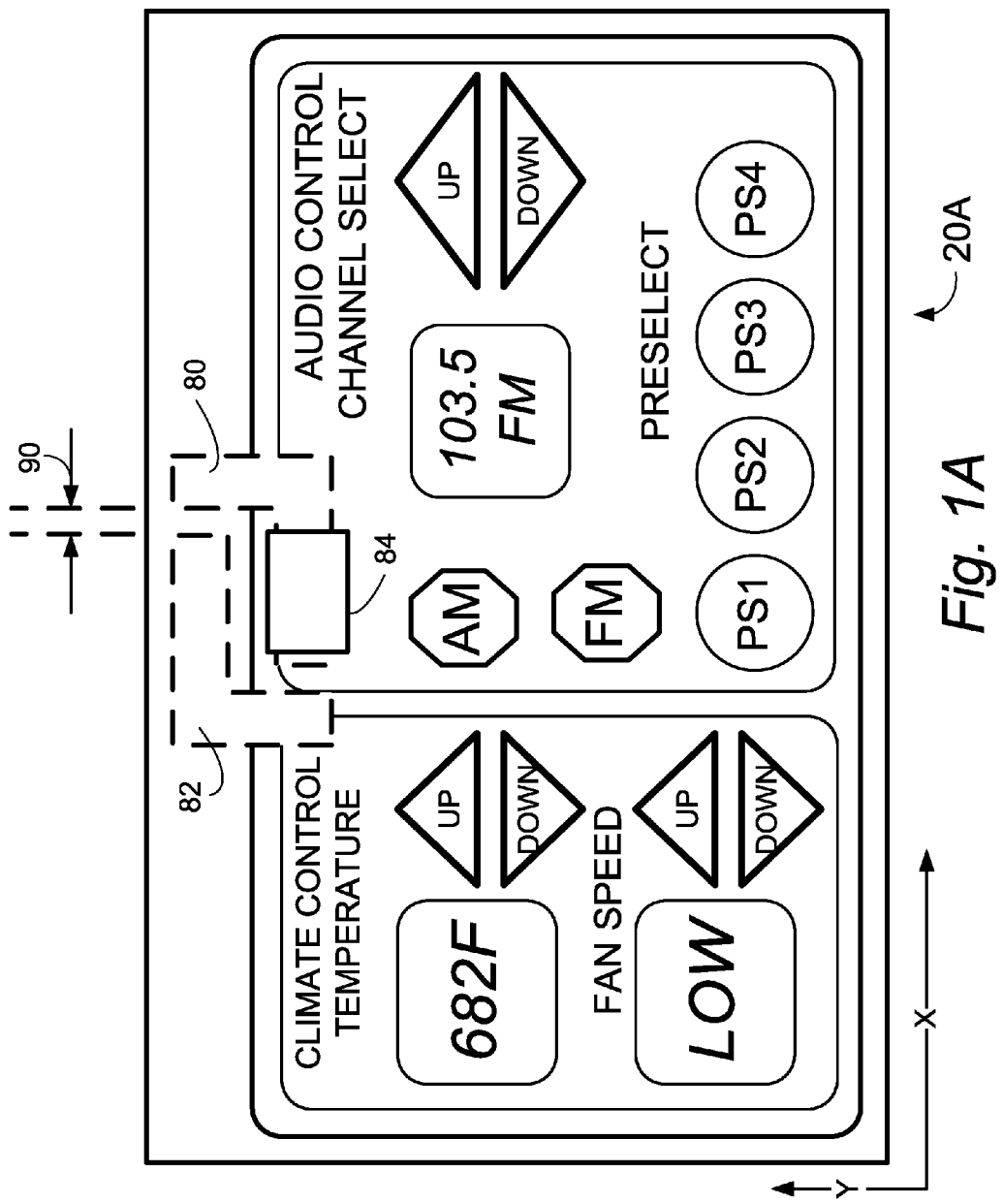
FIG. 1A is a front view of a control unit that comprises a haptic feedback device according to an example embodiment that employs a touch screen-type of user interface.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The phrase "example embodiment" refers to distinct, non-limiting embodiments which do not necessarily typify or characterize all embodiments encompassed by the technology disclosed herein.

FIG. 1A shows a control unit that also serves as a haptic feedback device 20A. The view of FIG. 1A is from the vantage of a human user or operator who interacts or interfaces with haptic feedback device 20. As such, FIG. 1A illustrates one example, non-exhaustive depiction of how a user interface of haptic feedback device 20A may appear to the human operator when the user interface transparently covers or cooperates with a graphical display. In particular, the user interface of FIG. 1A is a touch screen which overlays a graphical depiction (e.g., LCD, LED, or other type of display) suitable for a control unit for a vehicle. By way of non-limiting example, the graphical depiction of FIG. 1A includes both a climate control section and an audio control section. The climate control section comprises a first set of triangularly shaped symbols which, when touched by a human operator, either increase or decrease a thermostat set point and a second set of triangularly shaped symbols which, when touched by a human operator, either increase or decrease a fan speed. The audio control section comprises octagonal symbols which, when touched by a human operator, select either AM radio reception or FM radio reception. The audio control section further comprises triangularly shaped symbols which may be used by a human operator to either increase or decrease the channel of the selected radio reception type. The audio control section further comprises circular symbols which, when touched by a human operator, tune the receiver to respective pre-selected channels.

Which of the symbols of the graphical display of FIG. 1A is touched by a human operator, e.g., which symbol receives a human impulse, may be determined by location sensors of a transparent pressure sensitive film in the form of an X-Y matrix which comprises the user interface and which, in view of its transparent nature, permits exposure of the graphical depiction therebeneath. Of course, the graphical depiction of FIG. 1A is just an example, it being realized more or less sophisticated graphical depictions may be provided, as well as graphical depictions suitable for other types of devices and/or environments.

FIG. 1A is thus an example embodiment wherein a user interface comprises an essentially transparent two dimensional matrix configured to sense position of reception of an impulse (e.g., a human or tactile impulse). The transparent user interface overlays a display screen or the like configured to graphically illustrate plural input operations corresponding to plural positions of the two dimensional matrix of the user interface.

Figure 1B:
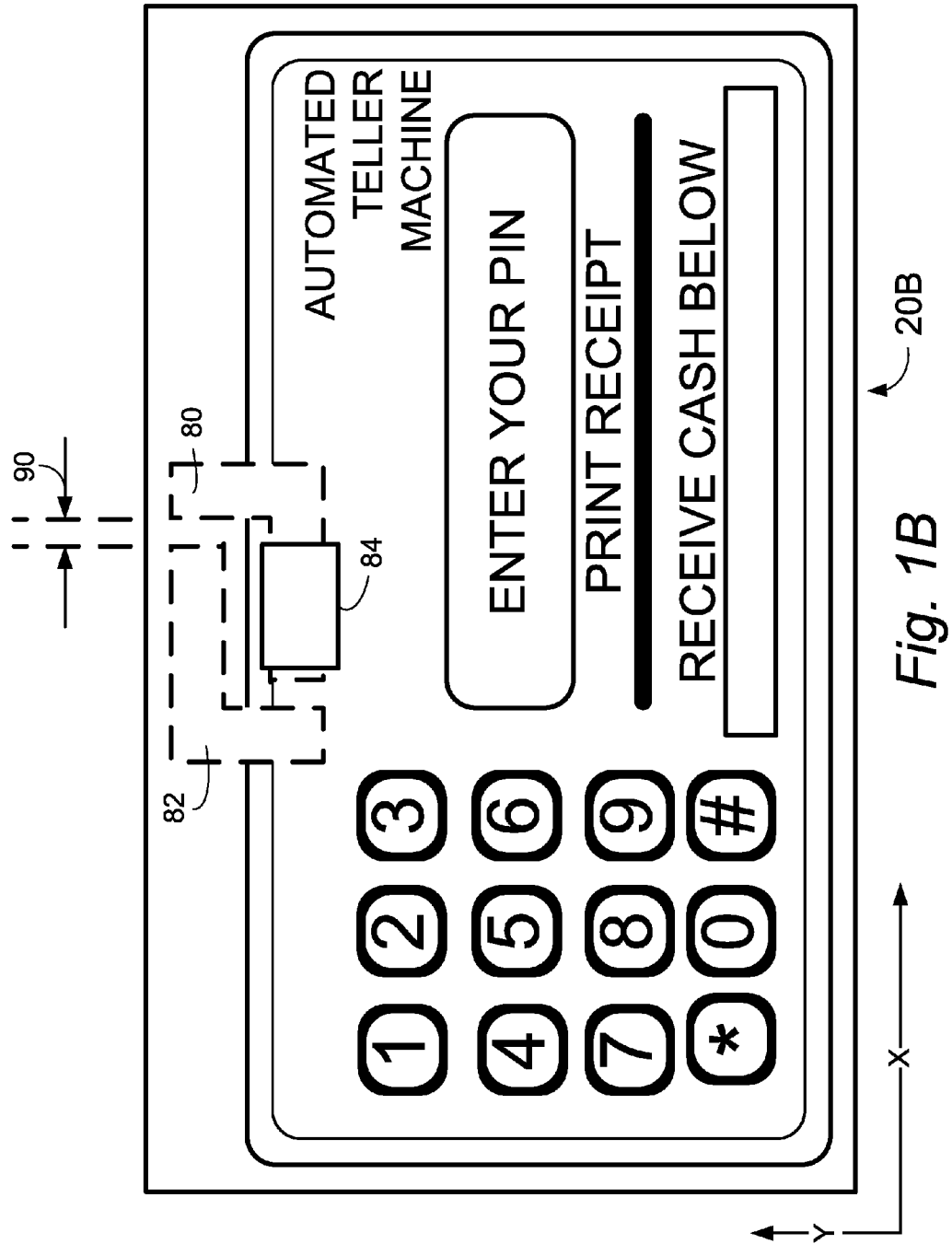
FIG. 1B is a front view of a control unit that comprises a haptic feedback device according to an example embodiment that employs a mechanical push button-type of user interface.

FIG. 1B shows another control unit that also serves as a haptic feedback device 20B, seen also from the vantage of a human user or operator. The user interface of haptic feedback device 20B comprises plural buttons or switches which may be mechanically depressed by human touch. When the pressure exerted through the buttons is sensed, appropriate phenomena or property such as capacitance may change and a signal applied to a processor. The example environment of employment of the haptic feedback device 20B of FIG. 1B is that of an automated teller machine (ATM) for a banking institution. FIG. 1B thus illustrates an example embodiment wherein a user interface comprises one or more discrete impulse reactant elements, such as push buttons or depressible buttons.

FIG. 1A and FIG. 1B are provided merely to illustrate two different examples of user interfaces that may be provided with haptic feedback devices according to the technology disclosed herein, as well as two different (and non-limiting) environments of use of such haptic feedback devices. As used herein, the nomenclature "haptic feedback device" or "haptic feedback device 20" (or any primed or multiply primed version thereof) is generally used to represent any suitable haptic encompassed hereby, including but not limited to the touch screen-type haptic feedback device 20A of FIG. 1A and the push button-type haptic feedback device 20B of FIG. 1B, regardless of field or environment of deployment, installation, or use. Accordingly, different example embodiments such as the embodiments of FIG. 2, FIG. 5, and FIG. 7, for example, may incorporate the touch screen-type of user interface of FIG. 1A, or the push button-type of graphical interface of FIG. 1B, or any other suitable type of graphical interface as the nature or type of such interfaces is not critical to structure of operation of the haptic feedback devices.

As shown in more detail in exploded side view fashion in FIG. 2, haptic feedback device 20 device comprises stationary frame 40; carrier 42 configured for at least one degree of motion relative to the stationary frame 40; user interface 44 mounted on or comprising the carrier 42 and configured to receive a human impulse; a set 46 of pole pieces; and, suspension system 48. In one example embodiment, the user interface 44 may be distinct from but connected to/mounted on the carrier 42; in another example embodiment the user interface may comprise or otherwise be integral with carrier 42.

Each of stationary frame 40, carrier 42, and interface 44 have an essentially rectangular shape in an X-Y plane, the X-Y plane being essentially parallel to the plane of the sheet of FIG. 1A and FIG. 1B. The carrier 42 may take the form of a hollow rectangular carrier frame which comprises two major members 52X and two minor members 52Y, the major members 52X extending in the X direction but spaced apart in the Y direction, the minor members 52Y extending in the Y direction but spaced apart in the X direction. The interior periphery surfaces of each of the members 52X and 52Y are formed to provide carrier shoulder 54, which in turn provides a notch or lip around the interior perimeter upper surface of carrier 44, and upon which user interface 44 rests and is supported. A pole mount 56, of essentially solid rectangular shape, depends (in the Z direction) from underneath a working one of major members 52X.

The carrier 42 and frame 40 may be fabricated from or comprise any suitable material(s), such as plastic, aluminum, or magnesium, for example.

In the particular example embodiment shown in FIG. 2, the user interface 44 takes the form of a transparent touch screen of the type that comprises an X-Y matrix detector which cooperates with electronics to provide an indication of a particular location in an X-Y matrix of the touch screen which receives a human impulse, e.g., the touch of a human finger or contact of a human-wielded instrumentality. The transparent touch screen of user interface 44 may comprise a film matrix having a ribbon cable or other signal carrier which is connected to electronics such as processor 58. The processor 58, along with other electronics components, may be mounted on a circuit board 60. In the illustrated embodiment, the circuit board 60 is carried (with processor 58 facing down) by stationary frame 40. Although in FIG. 2 the user interface 44 is shown as one member, user interface 44 comprises both the transparent film touch screen and a transparent backing substrate, such as a backing glass. The user interface 44, with both its transparent film touch screen and a transparent backing substrate, fits into the interior of carrier 42 so that edges of user interface 44 rest on and/or are supported by carrier shoulder 54. The user interface 44 may be sealed in position on carrier shoulder 54 by an adhesive, epoxy, or other appropriate fastener. Thus, the carrier 42 provides some degree of rigidity as well as mobility for the user interface 44 (relative to the stationary frame 40).

In the example embodiment of FIG. 2 user interface 44 covers (e.g., overlies), and may even comprise, a display screen 64 or the like. The display screen 64 is configured to graphically illustrate plural input operations corresponding to plural positions of the two dimensional matrix of user interface 44. The display screen 64 may be a liquid crystal display or other display (e.g., LED) suitable for illustrating positions on the overlying user interface 44 which correspond to "switches" or "buttons" which may be "pressed" by a human operator, as well as for illustrating explanatory text associated with each such button or switch. Electronics for operating display screen 64 may reside on circuit board 60, including display drivers, and may be connected to processor 58 for coordinated operation. The display screen 64 also has a rectangular shape in the X-Y plane, and is preferably sized to be accommodated within the periphery of carrier 42.

In one example embodiment the display screen 64 is mounted on stationary frame 40, and thus the display screen 64 also remains stationary. In such stationary mounted embodiment the display screen 64 may fit within the interior periphery defined by members 52 of carrier 42, but does not contact the members 52 nor is motion of carrier 42 impeded by the display screen 64 being internally located within carrier 42. Thus there may be an air gap between the display screen 64 and the user interface 44 which overlays it in order to permit user interface 44 to move (e.g., oscillate) with respect to display screen 64. In this stationary mount embodiment the carrier shoulder 54 does not move when the haptic feedback is provided, such that the image borne by display screen 64 may not be perceived as blurred.

In another example embodiment the display screen 64 is mounted to carrier 42 (rather than to stationary frame 40), and thus moves with carrier 42. For example, the user interface 44, carrier 42, and the set of pole pieces 46 may be formed as an integral unit, which may afford manufacturing efficiency and cost reduction. In this embodiment the display screen 64 may move (e.g., oscillate) slightly, but for a short time and at a time when the human operator may no longer be viewing the display screen 64.

The stationary frame 40 also has an essentially rectangular footprint in the X-Y plane. A top surface of stationary frame 40 may carry underneath, or comprise, the circuit board 60. As mentioned above, in one example alternative embodiment the top surface of stationary frame 40 may have the display screen 64 mounted thereon. Each corner of stationary frame 40 has a frame leg post 66 depending therefrom. Pairs of frame leg posts 66 aligned in the Y direction have their distal ends connected by leg braces 68 (which extended the Y direction). A major edge of stationary frame 40 (e.g., an edge extending along the X direction) has a notch 70 provided in its perimeter, near the center of the edge with respect to the X direction. When the haptic feedback device 20 is assembled, notch 70 serves to accommodate the pole mount 56 which depends from carrier 42. The underside of the top surface of stationary frame 40 also has two mounting pins 72 depending therefrom.

The stationary frame 40 comprises or has first pole piece 80 mounted thereto; the carrier 42 comprises or has second pole piece 82 mounted thereto. An electromagnetic coil 84 may be carried by either pole piece, but in the illustrated embodiment is shown as being carried by first pole piece 80 which, as just mentioned, is mounted to stationary frame 40. As such, the first pole piece 80 together with the electromagnetic coil 84 carried thereby may also be referred to as the "stator". The second pole piece 82 may also be referred to as the "armature". In another example embodiment, the electromagnetic coil 84 may be carried by the second pole piece 82 instead.

Figure 4:
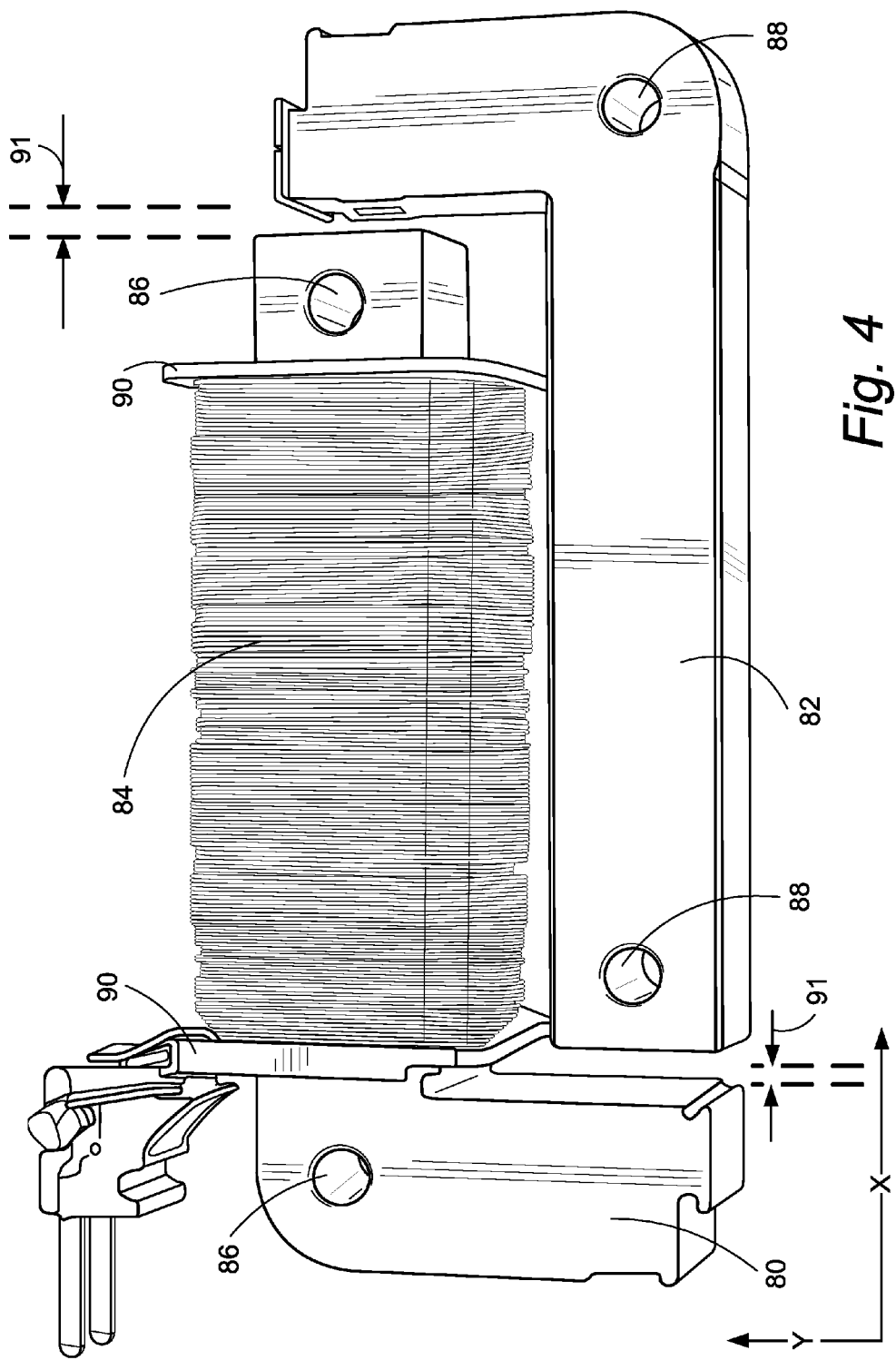
FIG. 4 is a perspective view of an example embodiment of a set of pole pieces and a coil suitable for use in haptic feedback devices.

The set of pole pieces 46 is shown in more detail in FIG. 4. The set of pole pieces 46 comprises first pole piece 80; second pole piece 82; and electromagnetic coil 84. The first pole piece 80 is mounted to stationary frame 40. In terms of assembly, first pole piece 80 has apertures 86 which are press-fit or otherwise secured to mounting pins 72 provided on the underside of stationary frame 40. The second pole piece 82 similarly has apertures 88 through which second pole piece 82 is mounted to the pole mount 56 of carrier 42 by fasteners 89.

Both first pole piece 80 and second pole piece 82 are shown as being essentially "L" shaped. In an example, non-limiting embodiment, each of first pole piece 80 and second pole piece 82 comprise a stack of laminations of soft iron. Longer legs of the "L" shaped pole pieces extend in the X direction, while shorter legs extend in the Y direction. The electromagnetic coil 84 may comprise a bobbin 90 or the like around which conductive wire (insulation coated) or magnet wire is wound. The bobbin 90 may have a hollow interior through which the pole piece 80 extends. Alternatively bobbin 90 may comprise the pole piece, with the magnet wire wound therearound.

Preferably but not necessarily, for sake of compactness the first pole piece 80 and second pole piece 82 may be situated beneath and thus within the perimeter of the overlying structures, such as user interface 44, carrier 42, and display screen 64. For that reason or otherwise and to show superimposed location, in some illustrations the first pole piece 80 and second pole piece 82 are illustrated with broken lines.

As shown in FIG. 4, a gap 91 exists between first pole piece 80 and second pole piece 82 in the X direction when electromagnetic coil 84 is not energized. The air gap 91 is defined by location of the first pole piece 80 and the second pole piece 82 when electromagnetic coil 84 is not energized. More particularly, two gaps 91 are provided: a first gap existing between the longer leg of first pole piece 80 and the shorter leg of second pole piece 82, and a second gap existing between the longer leg of the second pole piece 82 and the shorter leg of the first pole piece 80. The two gaps 91, being of the same size, are collectively referred to as the "air gap" or the "gap". The first pole piece 80 and second pole piece 82 are, in turn, separately located and mounted relative to the stationary frame 40 and carrier 42, respectively. Separate and independent mounting of the first pole piece 80 and the second pole piece 82 enables precise definition of the air gap 91 between the first pole piece 80 and second pole piece 82 in the first direction when the electromagnetic coil 84 is not energized.

Figure 14:
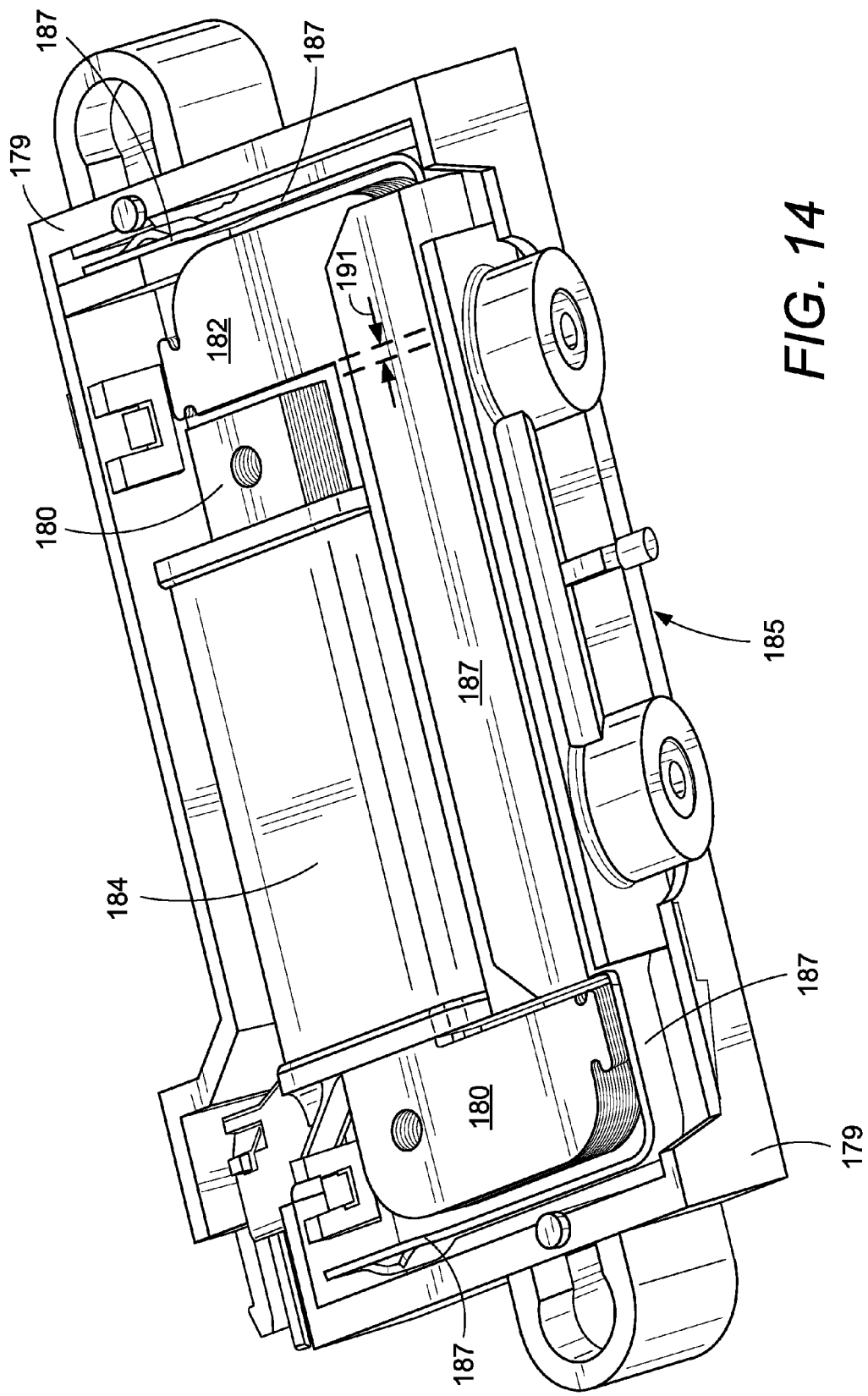
FIG. 14 is an isometric view of a second prior art device.

Thus, unlike prior art devices such as those illustrated in FIG. 13 and FIG. 14, the first pole piece 80 and second pole piece 82 are not carried by a distinct actuator unit, and in such sense provide an "actuatorless" or "actuator-free" haptic device. Such prior art actuator units comprise both pole pieces and position both pole pieces so that an air gap is predefined therein even before mounting to a stationary member and a moveable member, and the actuator units are connected as an intermediate component to both the stationary member and the moveable member.

The technology disclosed herein differs from the prior art in various ways. For example, the suspension system 48 is mechanically separated from both the first pole piece 80 and the second pole piece 82. In an example embodiment, suspension system 48 being mechanically separated from both the first pole piece 80 and the second pole piece 82 comprises the first pole piece 80 being mechanically connected to the stationary frame 40, the stationary frame 40 in turn being mechanically connected through the suspension system 48 to the carrier 42, and the carrier 42 in turn being mechanically connected to the second pole piece 82. In an example, unlimiting embodiment, "mechanically connected" means direct physical contact.

As another example of difference from the prior art, in an example embodiment the first pole piece 80 is not mounted to stationary frame 40 through a common intermediate component that also serves to locate second pole piece 82 relative to carrier 42. Moreover, in an example embodiment the stationary frame 40 and carrier 42 are connected by suspension system 48, but not by a distinct actuator component which comprises both a first pole piece and a second pole piece and further pre-locates an air gap between the first pole piece and the second pole piece. In an example embodiment, the carrier and the stationary frame are connected to one another only by the suspension system. Each of these distinct example embodiments, facilitates more accurate setting of the air gap 91, as explained herein.

Moreover, in an example embodiment the first pole piece 80 is mounted to the stationary frame 40 and the second pole piece 82 is mounted to the carrier 42 in a manner such that size of the gap 91 (when the electromagnetic coil is not energized) may be dependent only upon position of the first pole piece 80 as a result of mounting to the stationary frame 40 and position of the second pole piece 82 as a result of mounting to the carrier 42. As such, the size of the gap 91 (when the electromagnetic coil is not energized) is not affected by the suspension system.

As illustrated in example embodiments, the carrier 42 and the stationary frame 40 are connected to one another only by the suspension system 48. In particular, in an example embodiment the carrier 42 and the stationary frame 40 are connected to one another only by the suspension system 48 and not through a component that includes one or both of the first pole piece 80 and the second pole piece 82. In this regard, the suspension system 48 does not comprise or carry either first pole piece 80 or the second pole piece 82.

As explained herein, electromagnetic coil 84 is selectively energized as a result of receipt of the human impulse as applied to user interface 44, resulting in second pole piece 82 being attracted to first pole piece 80, and thus reducing gap 91. The coil-energized attraction of first pole piece 80 and second pole piece 82 causes movement of carrier 42, which carries the second pole piece 82, in the X direction toward the stationary frame 40 (the frame 40 carries first pole piece 80). In particular, when electromagnetic coil 84 is energized, magnetic force is generated which causes the second pole piece 82 to be attracted to first pole piece 80 to complete the magnetic flux path. As carrier 42 moves in the X direction, so also the user interface 44 mounted on carrier 42 moves.

In one example embodiment, energization of electromagnetic coil 84 causes second pole piece 82 to be attracted to first pole piece 80 so as to close gap 91 and cause impact of second pole piece 82 upon first pole piece 80. The impact of first pole piece 80 and second pole piece 82 is transmitted by suspension system 48 to carrier 42 and causes movement, vibration, or oscillation of the carrier 42 and user interface 44, which is sensed by the human finger as the finger is still touching or at least proximate the user interface 44.

In another example embodiment, the magnetic attraction and air gap geometry can be configured such that the magnetic actuation moves the armature to reduce the air gap, but the force of the spring and spacing prevents the pole pieces from coming into physical contact. Upon release of power from the coil 84, the armature (e.g., second pole piece 82) returns to its neutral position. Thus, in this alternative embodiment the air gap 91 never closes in the life of the product in normal use. The result of this embodiment allows for haptic motion to occur without any impact of any components and thus, can reduce wear, noise and the need for bumper components.

The carrier 42 is thus configured for at least one degree of motion relative to stationary frame 40. In the example embodiment of FIG. 2, the degree of motion of carrier 42 is along the X axis, in view of the air gap 91 existing along the X axis and the attraction and movement of second pole piece 82 toward first pole piece 80 in the X axis to close or at least narrow the gap 91 when electromagnetic coil 84 is energized.

The suspension system 48 connects the carrier 42 to stationary frame 40 and permits or facilitates movement (e.g., oscillation) of carrier 42 in the first direction, e.g., the X direction, when electromagnetic coil 84 is energized to drive the second pole piece 82 toward the first pole piece 80 at the gap 91. In general, for the embodiments herein described the suspension system 48 comprises at least two suspension members spaced apart along the first direction, e.g., direction X. The suspension members in general have an upper end which attaches to an underside of carrier 42 and a lower end which attaches to an upperside of leg braces 68.

When coil 84 is not energized (e.g., not energized for more than a few seconds), the springs comprising suspension system 48 find their own natural center, e.g., there is essentially no load on the springs when the coil is off. When the coil 84 is energized, the second pole piece 82 is attracted to the first pole piece 80, in a direction to close or at least narrow the air gap 91. When air gap 91 narrows, not only does the carrier 42 move but the springs comprising suspension system 48 are loading in the X direction as well.

In the particular example embodiment shown in FIG. 2 and FIG. 3, the suspension members comprise lateral suspension springs 92 which, when at rest, extend essentially in a plane perpendicular to the first direction (e.g., the springs 92 extend in the YZ plane). In the FIG. 2 and FIG. 3 embodiment there is one lateral suspension spring 92 at each end of haptic feedback device 20. The lateral suspension springs 92 have an essentially square "Z" shape, with one lateral end of each lateral suspension spring 92 having a connecting tab at is top and the opposite lateral end having a connecting tab at its bottom, the connecting tabs being employed for connection to (e.g., insertion into) carrier 42 and leg brace 68, respectively. The appropriately positioned and secured Z-shaped lateral suspension springs 92 do not allow carrier 42 to move up or down, or to tilt up or down, or to rotate left or right. Rather, lateral suspension springs 92 permits only one degree of motion along the X axis, e.g., left to right in the figures.

FIG. 5 and FIG. 6 illustrate another example embodiment of a haptic feedback device 20' which employs a differently configured suspension system 48'. The suspension system 48' of FIG. 5 and FIG. 6 comprises a first pair of suspension members 94A and a second pair of suspension members 94B, the first pair of suspension members 94A extending essentially in a first YZ plane and being spaced apart from one another in the first YZ plane. The second pair of suspension members 94B extending essentially in a second ZY plane and are spaced apart from one another along the Y axis in the second YZ plane. The first YZ plane and the second YZ plane are spaced apart from one another along the X direction and are perpendicular to the X direction. In the example embodiment of FIG. 5 and FIG. 6 the first pair of suspension members 94A and the second pair of suspension members 94B each have an essentially rectangular shape (the rectangle having a major dimension in the Z direction and a minor dimension in the Y direction), with connecting tabs provided at both the top and bottom edges of the minor dimension. The connecting tabs mate for fastening purposes (e.g., into holes or notches) to the underside of carrier 42 and to the top side of leg brace 68.

FIG. 7 and FIG. 8 illustrate yet another example embodiment of a haptic feedback device 20" which employs a differently configured suspension system 48". The suspension system 48" of FIG. 7 and FIG. 8 comprises a first pair of suspension members 96A and a second pair of suspension members 96B, the first pair of suspension members 96A extending essentially in a first YZ plane and being spaced apart from one another along the Y axis in the first YZ plane. The second pair of suspension members 96B extending essentially in a second ZY plane and are spaced apart from one another along the Y axis in the second YZ plane. The first YZ plane and the second YZ plane are spaced apart from one another along the X direction and are perpendicular to the X direction. In the example embodiment of FIG. 7 and FIG. 8 the first pair of suspension members 96A and the second pair of suspension members 96B are essentially linear, elongated, resilient pins which extend in the Z direction. The resilient pins 96B may have circular cross-section. The elongated, resilient pins 96 of the suspension system 48" are configured to facilitate or permit multi-directional movement of carrier 42, and thus user interface 44 carried thereon, when multi-directional haptic motion is employed.

The suspension members of the various embodiments of suspension system 48 are chosen to provide a predetermined sensation (e.g., movement or oscillatory sensation). The suspension members are therefore configured from materials having appropriate spring constants and are sized and shaped to achieve the desired sensation in view of the parameters and constraints of the entire device.

Figure 9:
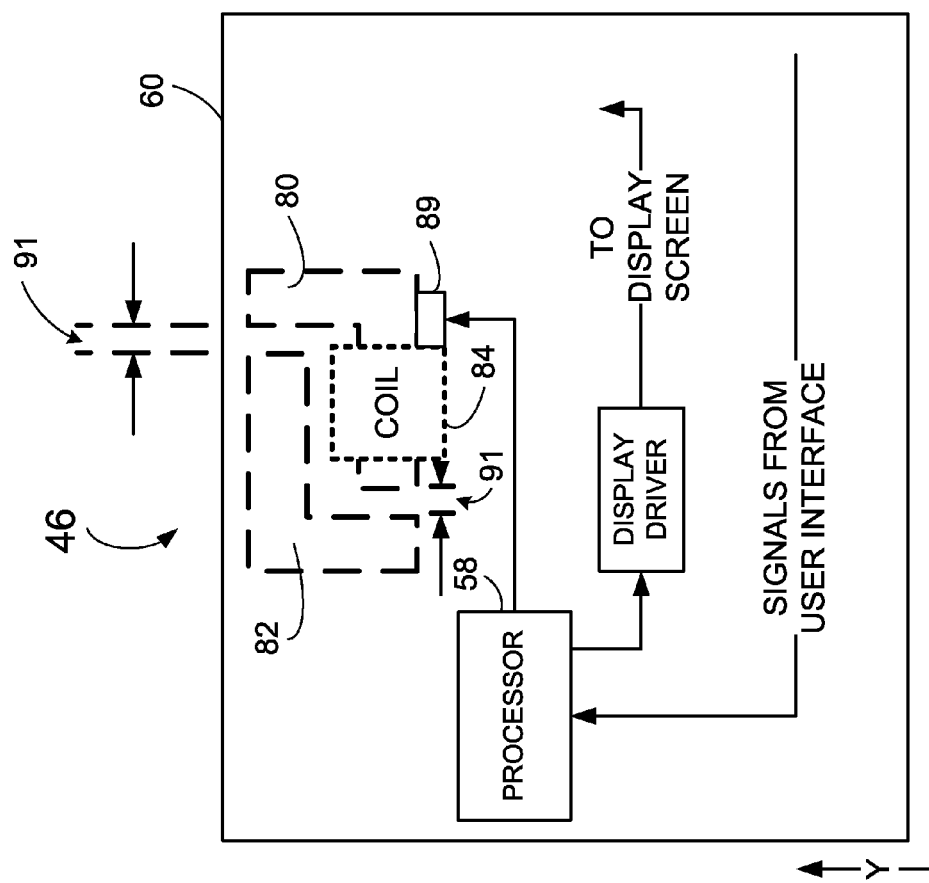
FIG. 9 is a schematic view of an example embodiment of a circuit board of a type that may be utilized in conjunction with various example embodiments of haptic feedback devices which provide one degree of motion feedback.

FIG. 9 illustrates portions of an example circuit board 60 for a haptic feedback device suitable for movement of carrier 42 and thus user interface 44 in one direction, e.g., the X direction. The circuit board 60 comprises the processor 58 which may connect to the electromagnetic coil 84 for applying a coil drive signal to electromagnetic coil 84; to (display driver) electronics for driving display screen 64; and to the user interface 44 for receiving therefrom signals indicative of the location of human impulse and thus an indication of what command or operation has been selected. Thus, the processor 58 may generate a coil-energization signal upon reception of the human impulse, so that the coil-energization signal energizes electromagnetic coil 84, thereby attracting second pole piece 82 toward first pole piece 80 and causing an impact.

Figure 10:
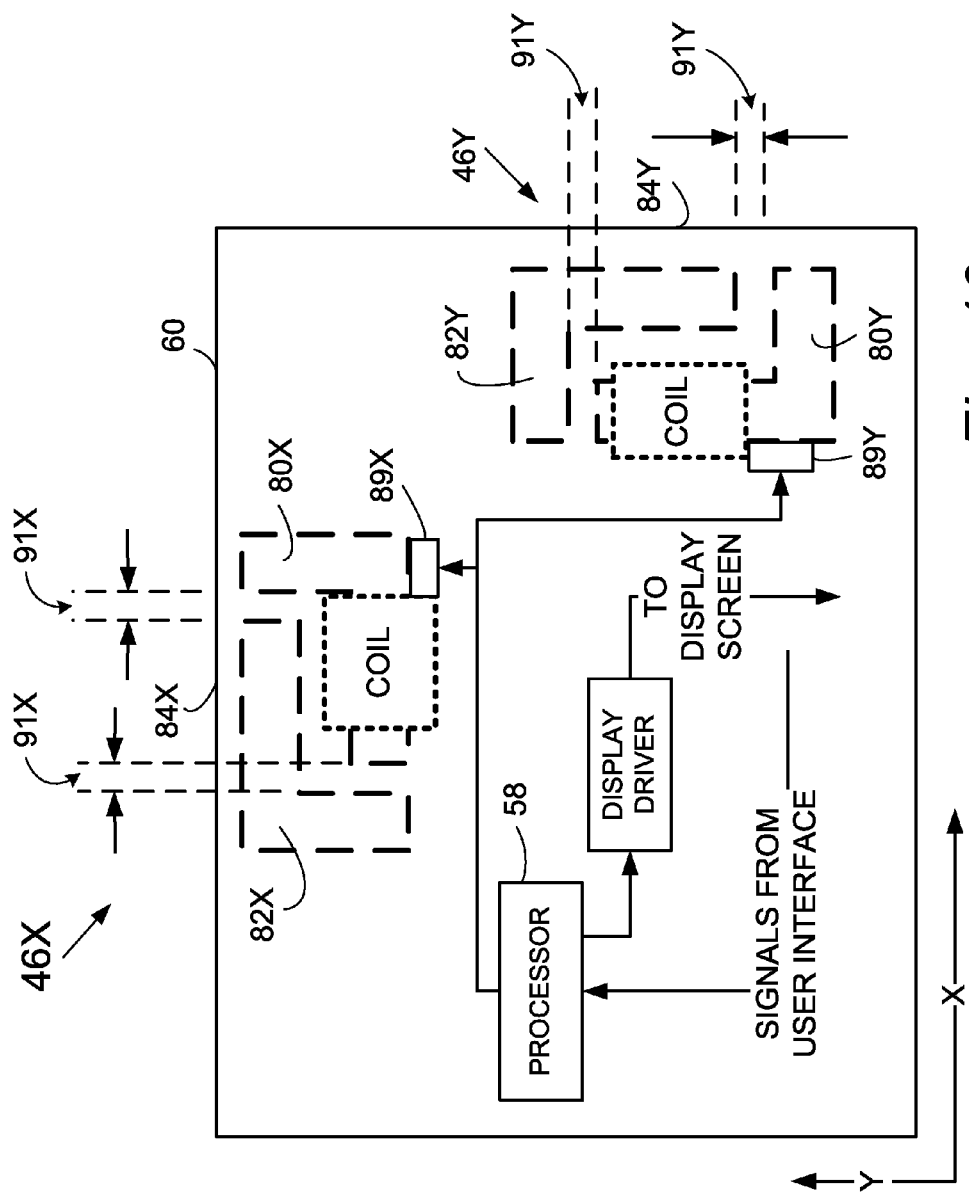
FIG. 10 is a schematic view of another example embodiment of a circuit board of a type that may be utilized in conjunction with various example embodiments of haptic feedback devices, and particularly haptic devices that may provide multiple degrees of motion feedback.

The example embodiment of FIG. 9 utilizes one set of pole pieces (i.e., first pole piece 80 and second pole piece 82) and provides for haptic motion or haptic feedback in one direction, e.g., the X direction. In yet another example embodiment illustrated with respect to FIG. 10 a haptic feedback device comprises both a first set of pole pieces 46X and a second set of pole pieces 46Y. The first pole piece set 46X of FIG. 10 resembles the pole piece set 46 of FIG. 9 and provides for movement and thus haptic feedback in the first direction, e.g., the X direction. Components of the first pole piece set 46X of FIG. 10 are suffixed with an "X" to refer to the first direction of haptic motion. The second set of pole pieces 46Y of FIG. 10 resembles the first set 46X but is oriented, positioned, and operable to provide for movement and thus haptic feedback in a second direction, e.g., the Y direction. Components of the second set of pole pieces 46Y of FIG. 10 are suffixed with a "Y" to refer to the second direction of haptic motion. The second pole piece 82Y of second set 46Y is mounted to carrier 42 and first pole piece 80Y of second pole piece set 46Y is mounted to stationary frame 40. Thus, for sake of terminology, the second pole piece set 46Y may be viewed as comprising a third pole piece 80Y mounted to the stationary frame 40; a fourth pole piece 82Y mounted to the carrier 42; and, a second electromagnetic coil 44Y carried by one of the third pole piece and the fourth pole piece. The third pole piece 80Y and the fourth pole piece 82Y are mounted to define a second air gap 91Y therebetween in the second or Y direction when the electromagnetic coil 84 is not energized. The second or Y direction corresponds to a second degree of motion, the second direction (in the Y direction) being perpendicular to the first direction (X direction).

Both first pole piece set 46X and second pole piece set 46Y are illustrated as having coil driving signals (applied to coil 84 via coil connectors 89) emanating from the processor 58. In some example implementations the coil driving signal applied is applied by processor 58 simultaneously to both first pole pieces set 46X and second pole pieces set 46Y so that haptic feedback occurs in both the X and Y direction simultaneously. In other example implementations, there may be a separate drive signal applied to each of first pole piece set 46X and second pole piece set 46Y so that different human impulses (corresponding to different commands or requested operations) yield different haptic feedbacks (e.g., haptic feedback in the X direction for one type of impulse/command and haptic feedback in the Y direction for another type of impulse/command).

The suspension system 48" of FIG. 7 and FIG. 9 is particularly advantageous for combination with the circuit board of FIG. 10 for facilitating the multi-directional movement or oscillation of carrier 42. The suspension members 96 in the form of elongated, resilient pins are capable of springy movement with respect to the YZ plane (e.g., in the X direction) and with respect to the XZ plane (e.g., in the Y direction). The second pole piece set 46Y is positioned to activate in the Y axis in a manner that also accommodates positioning of the suspension members. For example, the second pole piece set 46Y may be positioned along a Y axis edge of the assembly intermediate two elongated, resilient pins that form suspension members 96.

The suspension systems described herein, comprising spring-like members, may be molded as integral parts of the frame of carrier 42, e.g., of carrier frame minor members 52Y, for example. The shape of the spring component of the suspension systems, including the cross section and configuration of the spring component, may be such that single axis or multi axis is possible, especially when molded from the integral plastic. The springs may be formed using any material and method of manufacture: plastic, carbon fiber, metal, composite, extruded, molded, formed, stamped, etc.

Figure 11:
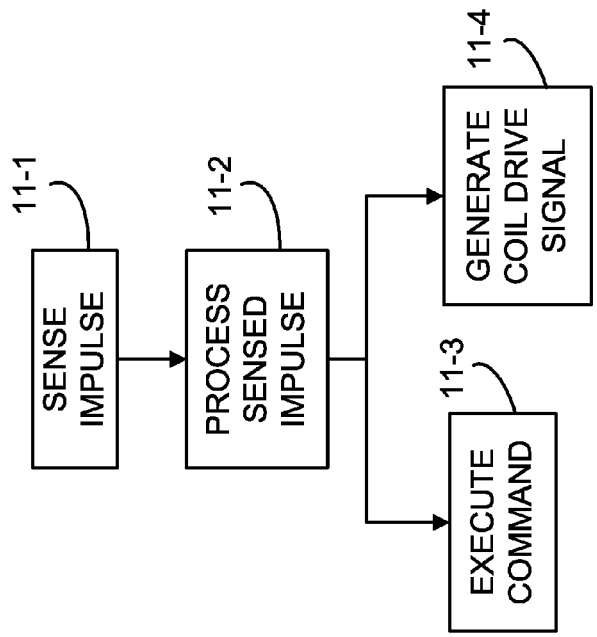
FIG. 11 is a flowchart showing example acts involved in operating a haptic feedback device according to an example mode.

FIG. 11 is a flowchart showing example acts involved in operating a haptic feedback device according to an example mode. When the human operator touches the user interface 44, as act 11-1 the impulse is sensed and the X and Y information of the location of impulse is sent to processor 58. As act 11-2 processor 58 processes the sensed impulse by discriminating the type of command entered or which button as pushed. As act 11-3 the processor 58 executes the command, e.g., initiates whatever action is required by the position touched on the screen (e.g., turn off the fan). Further, at essentially the same time processor 58 sends generates a coil drive signal which is applied to coil 84 to energize coil 84. The coil 84 is activated as fast as possible to provide essentially immediate feedback to the finger.

Thus, when the pressure is sensed at user interface 44, or the capacitance changes, a signal is applied to processor 58 that not only performs the location discrimination, but also initiates performance of the function corresponding to the location. The processor 58 also turns on coil 84 to generate the coil drive signal that energizes coil 84 and ultimately causes the vibration that gives the tactile feedback.

The coil drive signal may be of any desired format or configuration. For example, the coil drive signal may be a single pulse which indicates to turn on the coil 84. This signal could be any number of patterns, but for now it is just to energize the coil. Alternatively, the coil drive signal could be a train of pulses of desired magnitude.

Figure 12:
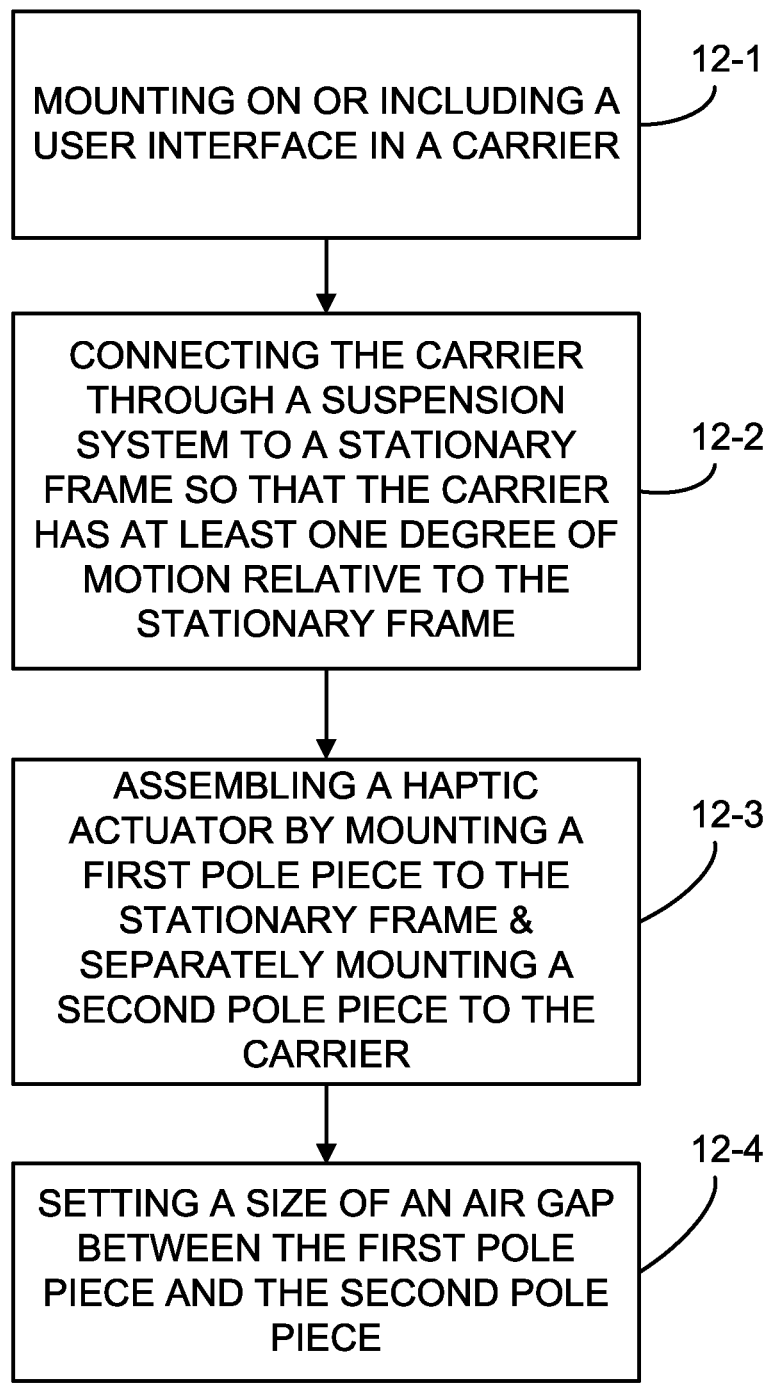
FIG. 12 is a flowchart depicting example, representative acts or steps involved in a method of making a haptic feedback device of the embodiments described herein.

FIG. 12 depicts example, representative acts or steps involved in a method of making a haptic feedback device of the embodiments described herein. In the example mode of FIG. 12, act 12-1 comprises mounting on or including a user interface in a carrier 42, the user interface being of a type, as explained above, that is configured to receive a human impulse. Although shown first, act 12-1 may be performed at any point in the assembly sequence. Act 12-2 comprises connecting the carrier 42 through a suspension system 48 to a stationary frame 40 so that the carrier 42 has at least one degree of motion relative to the stationary frame 40. In the example mode of FIG. 12, as act 12-1 stationary frame 40, carrier 42, suspension system 48, are assembled as understood with respect to the exploded illustrations, e.g., connecting the stationary frame 40 and the carrier 42 only through the suspension system 48. Act 12-3 comprises assembling a pole piece set 46 by separately mounting first pole piece 80 to the stationary frame 40 and by separately mounting second pole piece 82 to the carrier 42. Thus, in accordance with the method of FIG. 12 the stationary frame 40 and the carrier 42 are connected by suspension system 48 but not by a distinct actuator component which comprises both the first pole piece and the second pole piece.

One of the first pole piece 80 and the second pole piece 82 carries the electromagnetic coil 84. As explained above, preferably the first pole piece 80 is directly and rigidly mounted to stationary frame 40 and second pole piece 82 is directly and rigidly mounted to carrier 42. Act 12-3, e.g., the mounting of the pole pieces, may occur either subsequently or simultaneously with act 12-2 (e.g., be included in act 12-2). As part of act 12-3, one of the first pole piece 80 and the second pole piece 82 (preferably the first pole piece 80 which serves as the "stator") may be mounted with a means of adjusting the resulting air gap 91 between the first pole piece and the second pole piece. For example, slots or the like may be provided in the stationary frame or the first pole piece so that some sliding motion may occur between the first pole piece 80 and the stationary frame before fastening. Then, after act 12-3, as act 12-4 a size of air gap 91 is definitively and permanently set by fastening the adjustable pole piece relative to the member on which it is carried, e.g., the first pole piece 80 is securely fastened to the stationary frame so that no displacement now occurs between the first pole piece 80 and the stationary frame. Thus, unlike the devices of FIG. 13 and FIG. 14, the size of the air gap is precisely set at a time after all attachments affecting the pole pieces has occurred, so that the gap may not be affected by any subsequent assembly operations. The fact that the air gap 91 is precisely set in act 12-4 compensates for virtually all tolerances and achieves a system air gap that is very consistent. For example, if the air gap is set to 0.324, then the system air gap results in an air gap of 0.324. The system-to-system variation is now very, very small, resulting in higher performance of all systems produced. Thus, the first pole piece 80 and second pole piece 82 are located to the stationary frame 40 and the carrier 42 separately or independently of one another, with the magnetic gap 91 between the two pole pieces then being subsequently set. This allows for a far more precise system, as well as the elimination of multiple components.

The haptic feedback devices of the technology disclosed herein attempt to provide tactile feedback (e.g., vibration) as soon as possible, so that the operator knows that the touch on the user interface 44 did, in fact, work.

The haptic feedback, e.g., the nature of the oscillation or vibration, may depend on several factors. The vibration frequency depends on a combination of different things, including the size and composition and manner of anchoring or fastening the springs of the suspension system; the type (whether a sine wave or a singular square wave, or multiple square waves) and periodicity of the coil drive signal. It may be manufacturer's choice as to what kind of drive signal is utilized, depending on what type of action is requested by the operator. For example, to change the temperature, a different type of coil drive signal may be applied to obtain a different feedback feel, as opposed to another type of requested operation. Thus, the coil could be driven differently depending on what button, or which XY location, is pressed.

The haptic feedback device may be utilized in many diverse environments and/or incorporated into various types of equipment, vehicles, or appliances. As one example, stationary frame may comprise or be configured to mount to a dashboard of a vehicle. For example, stationary frame 40 is non-moving, and may actually be formed as or in the dashboard of a vehicle, for example. The stationary frame 40 is not meant to move relative to the vehicle in which it is carried or mounted. The stationary frame 40 can either be mounted to a dashboard, or be part of the dashboard.

As another example, the stationary frame may comprise or be configured to mount to a control panel of a document processing machine, such as a photocopy machine, for example. As yet another example, the stationary frame may comprise or be configured to mount to a control panel of an automated banking machine.

The haptic feedback device need not necessarily be incorporated into another or host apparatus, but can instead be co-extensive with and incorporated into apparatus or device with which it is utilized.

The haptic feedback devices encompassed hereby eliminate need for an intact or distinct actuator, e.g., an actuator as in the prior art actuator in which both stator and coil are carried by the same component such as a stationary base or frame. Rather, the haptic feedback devices encompassed hereby mount a first pole piece (and an electromagnetic coil) to a stationary frame, and separately mount a second pole piece to a movable carrier which carries an input interface. By being "separately" mounted is meant that the first pole piece is not mounted to the stationary frame through a common component (e.g., an actuator) that also serves to locate the second pole piece relative to the carrier, nor is the second pole piece mounted to the carrier through a common component that also serves to locate the first pole piece to the stationary frame. The carrier is physically moved relative to the stationary base/frame by magnetic force when the coil is energized. The technology described herein also includes an elegant suspension system for mounting a haptic service as well as a method(s) of directional loading.

The haptic surface (e.g., user interface 44) becomes an integral part of the magnetically induced movement and therefore the precision of the displacement and the acceleration is better controlled in a manufacturing environment. The configuration is simple with fewer parts and provides a system loading to contribute to the haptic actuation. Direction of haptic movement is inherently controlled to a single axis and at least some embodiments, while other axes are maintained with minimal movement. Such embodiments realize cost reduction as compared to other haptic configurations, and also had improved performance, manufacturing quality, and less performance variation.

As understood from the foregoing, in an example embodiment, an armature lamination is mounted to a carrier; a coil/stator is mounted to a base. The relative position in a non-energize configuration, in conjunction with the suspension system is precisely positioned such that when the coil is energized, the armature, and hence the carrier move in a predictable manner in a controlled direction. When de-energized, the carrier returns to its normal, neutral position after dissipating stored energy. In some example embodiments, when the energize/de-energize cycle is rapidly applied, haptic motion is the result. A stationary base is attached to a moving carrier that serves as the haptic surface. The base and the carrier are attached using at least one or more connecting members that serve to hold the base and carrier in relative position to each other through the connecting member's orientation and attachment to the base and carrier. In one embodiment, the connecting member is a flat blade, comprising spring-like material. A flat blade has the advantage of holding a position into axes while allowing movement in a third axis. When flat blades are prepared to mount to a base, then the haptic movement in a single axis as achieved.

Alternate embodiments of suspension configurations provide a lateral spring rate, while holding a suspended separation between the stationary base and the movable carrier. One such suspension system comprises pins that are perpendicular to a plane of the haptic screen, and a lateral haptic affect is achieved through the magnetic members. Yet another alternate suspension system comprises one or more flat blades that are configured to create a suspended separation between the base and the carrier. This system tends to have greater directional haptic axis orientation to achieve performance requirements.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An actuatorless haptic feedback device comprising:
   a stationary frame comprising a first pole piece directly mounted thereto;
   a carrier configured for at least one degree of motion relative to the stationary frame, the carrier comprising a second pole piece directly mounted thereto;
   a user interface mounted on or comprising the carrier and configured to receive an impulse;
   an electromagnetic coil carried by one of the first pole piece and the second pole piece, the electromagnetic coil being selectively energized as a result of receipt of the impulse;
   the first pole piece and the second pole piece being separately located relative to the stationary frame and the carrier, respectively, to define an air gap therebetween in a first direction when the electromagnetic coil is not energized, the first direction corresponding to the at least one degree of motion;
   a suspension system being configured to connect the carrier to the stationary frame and to allow relative movement between the carrier and the stationary frame in the first direction when the electromagnetic coil is energized to drive the second pole piece toward the first pole piece at the gap;
   wherein the carrier and the stationary frame are connected to one another by the suspension system but not by an intermediate actuator component which comprises the first pole piece and the second pole piece;
   wherein the first pole piece and the second pole piece are not carried by a distinct actuator unit but are respectively directly mounted to the stationary frame and the carrier;
   wherein the suspension system is mechanically separated from both the first pole piece and the second pole piece.

2. The haptic feedback device of claim 1, wherein the suspension system being mechanically separated from both the first pole piece and the second pole piece comprises the first pole piece being mechanically connected to the stationary frame, the stationary frame being mechanically connected through the suspension system to the carrier, and the carrier being mechanically connected to the second pole piece.

3. The haptic feedback device of claim 1, wherein the first pole piece is not mounted to the stationary frame through a common intermediate component that also serves to locate the second pole piece relative to the carrier.

4. The haptic feedback device of claim 1, wherein the first pole piece is rigidly mounted to the stationary frame and the second pole piece is rigidly mounted to the carrier.

5. The haptic feedback device of claim 1, wherein the suspension system comprises at least two suspension members spaced apart along the first direction.

6. The haptic feedback device of claim 5, wherein the at least two suspension members comprise suspension springs which, when at rest, extend essentially in a plane perpendicular to the first direction.

7. The haptic feedback device of claim 5, wherein the at least two suspension members comprise a first pair of suspension members and a second pair of suspension members, the first pair of suspension members extending essentially in a first plane and being spaced apart from one another in the first plane; the second pair of suspension members extending essentially in a second plane and being spaced apart from one another in the second plane; the first plane and the second plane being spaced apart from one another and perpendicular to the first direction.

8. The haptic feedback device of claim 7, wherein each of the suspension members comprises an essentially circular cross-section resilient pin configured for multi-directional movement.

9. The haptic feedback device of claim 1, wherein the suspension system is configured to facilitate multi-dimensional haptic movement.

10. The haptic feedback device of claim 1, further comprising:
    a third pole piece mounted to the stationary frame;
    a fourth pole piece mounted to the carrier;
    a second electromagnetic coil carried by one of the third pole piece and the fourth pole piece, the second electromagnetic coil being selectively energized as a result of receipt of the impulse;
    the third pole piece and the fourth pole piece being mounted to define a second air gap therebetween in a second direction when the electromagnetic coil is not energized, the second direction corresponding to the a second degree of motion, the second direction being perpendicular to the first direction.

11. The haptic feedback device of claim 1, wherein the stationary frame comprises or is configured to mount to a dashboard of a vehicle.

12. The haptic feedback device of claim 1, wherein the stationary frame comprises or is configured to mount to a control panel of a document processing machine.

13. The haptic feedback device of claim 1, wherein the stationary frame comprises or is configured to mount to a control panel of an automated banking machine.

14. The haptic feedback device of claim 1, wherein:
    the user interface extends in an X-Y plane;
    the carrier extends in an X-Y plane and is configured to support the user interface;
    the stationary frame extends in an X-Y plane beneath the X-Y plane of the carrier.

15. The haptic feedback device of claim 14, wherein in a Z direction the first pole piece and the second pole piece are mounted within a perimeter of the carrier.

16. The haptic feedback device of claim 14, wherein, in a direction perpendicular to the perimeter of the stationary frame, the first pole piece and the second pole piece are mounted within a perimeter of the carrier.

17. The haptic feedback device of claim 1, wherein the stationary frame has essentially rectangular perimeter in a plane and wherein the perimeter which comprises a perimeter notch, and wherein the perimeter notch is configured to accommodate a pole mount, the pole mount depending from the carrier and having the second pole piece mounted thereon.

18. A method of making an actuatorless haptic feedback device comprising:
    mounting on or including a user interface in a carrier, the user interface being configured to receive an impulse;
    connecting the carrier through a suspension system to a stationary frame so that the carrier has at least one degree of motion relative to the stationary frame;
    mounting a first pole piece directly to the stationary frame and separately mounting a second pole piece directly to the carrier, one of the first pole piece and the second pole piece carrying an electromagnetic coil, the suspension system being mechanically separated from both the first pole piece and the second pole piece whereby the carrier and the stationary frame are connected to one another by the suspension system but not by an intermediate actuator component which comprises the first pole piece and the second pole piece, and whereby the first pole piece and the second pole piece are not carried by a distinct actuator unit but are respectively directly mounted to the stationary frame and the carrier; and thereafter setting a size of an air gap between the first pole piece and the second pole piece.

19. The method of claim 18, further comprising mechanically separating the suspension system from both the first pole piece and the second pole piece by mechanically connected the first pole piece to the stationary frame, mechanically connecting the stationary frame through the suspension system to the carrier, and mechnically connecting the carrier to the second pole piece.

20. The method of claim 19, further comprising mounting or including the stationary frame to/on a control panel of an automated banking machine.

21. The method of claim 18, further comprising mounting the first pole piece to the stationary frame but not through a common intermediate component that also serves to locate the second pole piece relative to the carrier.

22. The method of claim 18, further comprising forming the suspension system to comprise at least two suspension members spaced apart along the first direction.

23. The method of claim 18, further comprising forming the at least two suspension members to comprise suspension springs which, when at rest, extend essentially in a plane perpendicular to the first direction.

24. The method of claim 18, further comprising forming the at least two suspension members to comprise a first pair of suspension members and a second pair of suspension members, the first pair of suspension members extending essentially in a first plane and being spaced apart from one another in the first plane; the second pair of suspension members extending essentially in a second plane and being spaced apart from one another in the second plane; the first plane and the second plane being spaced apart from one another and perpendicular to the first direction.

25. The method of claim 18, further comprising forming each of the suspension members to comprise a resilient pin configured for multi-directional movement.

26. The method of claim 18, further comprising:
mounting a third pole piece to the stationary frame;
mounting a fourth pole piece to the carrier;
providing a second electromagnetic coil for one of the third pole piece and the fourth pole piece, the second electromagnetic coil being selectively energized as a result of receipt of the impulse;
separately mounting the third pole piece and the fourth pole piece to define a second air gap therebetween in a second direction when the electromagnetic coil is not energized, the second direction corresponding to the a second degree of motion, the second direction being perpendicular to the first direction.

27. The method of claim 18, further comprising mounting or including the stationary frame to/on a dashboard of a vehicle.

28. The method of claim 18, further comprising mounting or including the stationary frame to/on a control panel of a document processing machine.

* * * * *